US011638394B2

(12) United States Patent
Creech et al.

(10) Patent No.: US 11,638,394 B2
(45) Date of Patent: May 2, 2023

(54) SYSTEM FOR AGRICULTURAL WATER OXYGENATION

(71) Applicant: AG-OX, LLC, Labelle, FL (US)

(72) Inventors: Buford J. Creech, Clermont, FL (US); Gary T. Henderson, Wauchula, FL (US)

(73) Assignee: AG-OX, LLC, Labelle, FL (US)

( * ) Notice: Subject to any disclaimer, the term of this patent is extended or adjusted under 35 U.S.C. 154(b) by 0 days.

(21) Appl. No.: 17/785,024

(22) PCT Filed: Dec. 31, 2020

(86) PCT No.: PCT/US2020/067634
§ 371 (c)(1),
(2) Date: Jun. 13, 2022

(87) PCT Pub. No.: WO2021/138539
PCT Pub. Date: Jul. 8, 2021

(65) Prior Publication Data
US 2023/0031677 A1 Feb. 2, 2023

Related U.S. Application Data

(60) Provisional application No. 62/956,582, filed on Jan. 2, 2020.

(51) Int. Cl.
*A01C 23/00* (2006.01)
*A01C 23/04* (2006.01)
(Continued)

(52) U.S. Cl.
CPC .......... *A01C 23/042* (2013.01); *B01F 23/451* (2022.01); *B01F 23/481* (2022.01);
(Continued)

(58) Field of Classification Search
CPC .. A01C 23/042; B01F 35/2213; B01F 23/451; B01F 35/2113; B01F 35/2211;
(Continued)

(56) References Cited

U.S. PATENT DOCUMENTS

| 3,505,213 A | * | 4/1970 | Anthony et al. .......... C02F 3/20 |
| | | | 210/614 |
| 3,633,884 A | * | 1/1972 | Holmes ..................... C02F 3/26 |
| | | | 210/220 |

(Continued)

FOREIGN PATENT DOCUMENTS

| EP | 2184097 A1 | 5/2010 |
| WO | WO-1999-039561 | 8/1999 |
| WO | WO-2001087052 A2 | 11/2001 |

*Primary Examiner* — Benjamin F Fiorello
(74) *Attorney, Agent, or Firm* — Christopher Paradies; Paradies Law P.A.

(57) ABSTRACT

A system for agricultural irrigation water oxygenation for enriching soil oxygen level comprises a source of compressed oxygen (and not compressed air) coupled to a water line feeding an irrigation system, such as a drip irrigation system. The coupling system may include a pressure sensor for measuring the pressure in the water line, a solenoid safety valve, a control valve, a flow meter and a controller that controls the flow of oxygen from the source of compressed liquid oxygen to the water line using the components of the coupling system, without using a special cavitation valve and using off-the-shelf components while achieving the same benefits as a system incorporating the special cavitation valve.

21 Claims, 4 Drawing Sheets

(51) Int. Cl.
  *B01F 23/40* (2022.01)
  *B01F 23/451* (2022.01)
  *B01F 35/21* (2022.01)
  *B01F 35/221* (2022.01)
  *B01F 35/22* (2022.01)
  *B01F 101/00* (2022.01)

(52) U.S. Cl.
  CPC ...... *B01F 35/2113* (2022.01); *B01F 35/2132* (2022.01); *B01F 35/2202* (2022.01); *B01F 35/2211* (2022.01); *B01F 35/2213* (2022.01); *B01F 2101/305* (2022.01)

(58) Field of Classification Search
  CPC ............... B01F 23/481; B01F 35/2202; B01F 35/2132; B01F 2101/305; C02F 1/727
  See application file for complete search history.

(56) References Cited

U.S. PATENT DOCUMENTS

| | | | | |
|---|---|---|---|---|
| 3,671,022 | A * | 6/1972 | Laird | B01F 23/454 |
| | | | | 210/220 |
| 4,057,933 | A * | 11/1977 | Enyeart | A01G 27/00 |
| | | | | 47/79 |
| 5,054,690 | A | 10/1991 | Olson | |
| 5,534,143 | A | 7/1996 | Portier et al. | |
| 6,173,526 | B1 * | 1/2001 | Mazzei | A01C 23/04 |
| | | | | 47/48.5 |
| 6,394,429 | B2 | 5/2002 | Ganan-Calvo | |
| 6,719,904 | B2 * | 4/2004 | Schindler | B09C 1/00 |
| | | | | 210/170.07 |
| 6,740,238 | B2 * | 5/2004 | Schindler | B09C 1/00 |
| | | | | 210/170.07 |
| 7,670,495 | B2 | 3/2010 | Senkiw | |
| 9,815,714 | B2 | 11/2017 | Franshaw | |
| 2003/0196375 | A1 * | 10/2003 | Ferro | A01C 11/04 |
| | | | | 47/58.1 SC |
| 2014/0263706 | A1 | 9/2014 | Wolgast | |
| 2020/0029600 | A1 * | 1/2020 | Colina | B67C 7/00 |

\* cited by examiner

(PRIOR ART)

FIG. 4

SYSTEM FOR AGRICULTURAL WATER OXYGENATION

CROSS RELATED APPLICATIONS

This application is a 371 U.S. national phase application which claims priority to PCT/US2020/067634 filed Dec. 31, 2020 which claims the benefit of the filing date of U.S. provisional application 62/956,582 filed Jan. 2, 2020 entitled SYSTEM FOR AGRICULTURAL WATER OXYGENATION, the entire disclosure of which is incorporated by reference herein in its entirety.

FIELD OF THE INVENTION

The field relates to agricultural implements that enrich the soil to increase yields.

BACKGROUND

Figure 1:
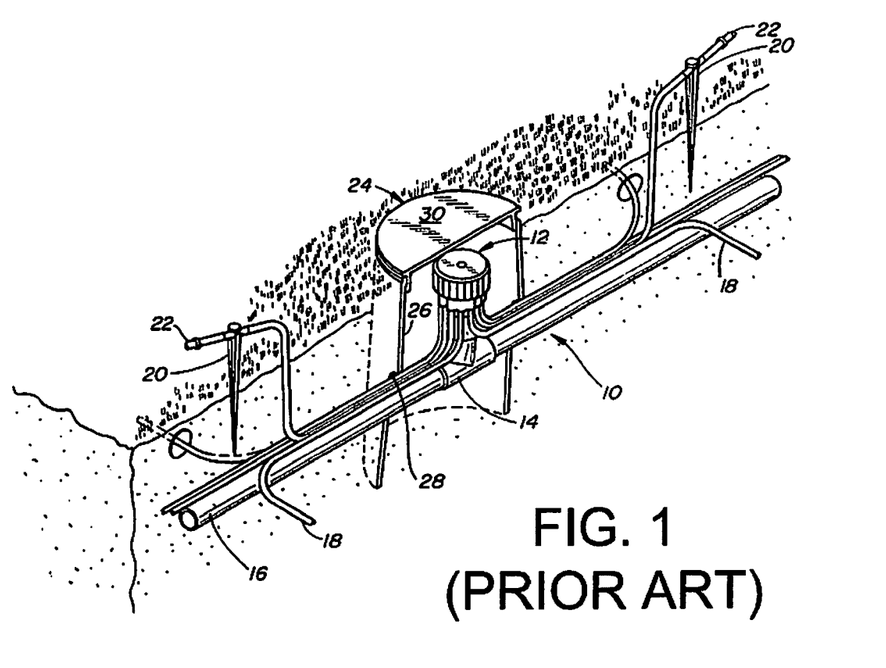
FIG. 1 shows a drip irrigation system known in the art.

Many types of drip irrigation systems are known. U.S. Pat. No. 5,054,690 discloses a hub and spoke type of drip irrigation system, as illustrated in FIG. 1, for example. A manifold distributes irrigation water through a plurality of lines. Instead of using specific points for drip irrigation, some systems use lines that weep along the length of the line or hose; however, for the large areas used in irrigation crops, most drip irrigation systems have some type of manifold or branching structure to cover the area where the plants roots are growing.

It is known that soil nourishes plants, and healthy soil increases yields. Therefore, farmers have applied fertilizers and pesticides using drip irrigations systems to deliver the fertilizers and pesticides.

It is known that plants need water, oxygen and other nutrients throughout the life cycle of the plants, and drip irrigation systems may be used to provide some of these nutrients and necessary gases.

Water is present in the interstices within soil and refills from rainfall and irrigation, naturally. Oxygen, nitrogen and other gases are available from the air and may migrate to the soil to the roots or through foliage or via aeration of the water supply.

Oxygen is one gas known to be important for plants. Naturally, irrigation by spraying water and rain water dissolves oxygen in the water, naturally, from the air, which is ordinarily adequate for growing crops. Water is also necessary, but soil that is too wet will suffocate microbial activity necessary for healthy plants. Farmers know that plants often grow best when soil is wetted and permitted to dry, repeatedly, providing water and oxygen and supporting microbial activity, while preventing drowning, soil compaction and root rot and other problems that may be caused by excessive wetness. Therefore, variability of wet, dry, oxygen, other gases and microbial activity is considered desirable.

Others have attempted to control the supply of oxygen to soil with the intent to improve yields. For example, aerating irrigation water may increase oxygen concentration in the water. Previous efforts achieved disappointing results in practice, especially over a substantial area of a field. Small improvements in yield were commercially insignificant compared to the costs in loss of water and expense of equipment and power.

The recent direction for oxygenation of water is toward low energy production of oxygen in water using electrolysis. For example, U.S. Pat. No. 7,670,495 discloses a method of using electrolysis for oxygenating water. U.S. Pat. No. 9,815,714 discloses a lower current method of using electrolysis. Mixing oxygen with water is inefficient if " . . . the resulting large bubbles produced simply break the surface and are discharged into the atmosphere," according to U.S. Pat. No. 7,670,495. "Attempts . . . to reduce the size of the bubbles in order to facilitate oxygen transfer by increasing the total surface area of the oxygen bubbles," were insufficient according to U.S. Pat. No. 7,670,495, which specifically identified U.S. Pat. No. 5,534,143, which discloses a microbubble generator, and U.S. Pat. No. 6,394,429, which discloses a device for producing even smaller microbubbles, ranging in size from 0.1 to 100 microns in diameter, by forcing air into the fluid at high pressure through a small orifice (or nozzle).

In WO1999039561A1, the specification indicates that adjacent plots of land using identical irrigation systems and operating identically, except for introduction of an air supply using its invention resulted in surprisingly and unpredictably favorable improvements based on its invention. The peppers reached a given point of maturity about one week sooner than peppers in the control plot. It was pointed out that this makes a significant difference with respect to price at the beginning of a season, especially. In addition, there was an increase in yield, by weight, over the full season in the treated plots compared to the control plots. The invention added air to the irrigation water using a certain type of nozzle, which the specification suggested improved the soil's microbial activity for better plant food uptake as a total body by the injection of the air to the subsurface root region of the plant. Oxygenated water was released by drip irrigation beneath the surface of the soil or beneath a covering for the soil such as a mulch or plastic sheet, released through spaced-apart, drip irrigation emitters (special holes) directly into the subsurface soil near the plant's roots. Under system pressure, the water was capable of dissolving more gases from the air than it would under atmospheric pressure. In practice, the specification indicates that the water also contained bubbles of air that did not dissolve, and the excess oxygen dissolved and carried in bubbles was released upon exiting the pressurized system. The nozzle was selected specifically to create very small micro-bubbles with the idea that, while the bubbles would coalesce, it would provide better distribution of gaseous air throughout the system using a special mixer-injector for injecting the air into the water under pressure than without using the special mixer-injector nozzle. The mixer-injector was a cavitating type that used a flow passage with a constricting portion, an injection portion, and an expanding portion in that order. Air entered the injection portion through an injection port in the injection portion, and produced a reduced pressure via turbulence in the injection portion. The turbulence in the injection portion reduced pressure within the portion, allowing the air to be injected and was thought to be necessary to disperse the treatment gas throughout the water stream and to reduce the size and increasing the number of the micro-bubbles. The turbulence, distribution and reduction in bubble size was improved by providing twisting vanes in the constricting portion and straightening vanes in the expanding portion of the nozzle. The stream from the expanding portion proceeded to one or more manifolds, and from there through tubing to points of discharge, as is known in the art of drip irrigation. Thus, the specific type of nozzle in the specification was the essential element to make the invention work by allowing air to be injected into a stream of water with the characteristics essential to providing the surprising benefits observed in the disclosure.

SUMMARY

In one example, a source of compressed liquid oxygen is coupled to a stream of water at the correct pressure to inject oxygen into the stream of water. The use of liquid oxygen or LOX is very different than the use of air. For one thing, air is predominantly nitrogen (more than 78%). Also, using a source of LOX in the system means that a special, cavitation type of nozzle is not required for introducing oxygen into the stream of water. Since LOX is compressed and expands during the transformation from liquid to gas, a separate compressor is not required to compress air to inject it into a pressurized line of water, either. Surprisingly, oxygen injection by this method is capable of providing saturation of oxygen at the line pressure of the water. For example, a system for agricultural water oxygenation comprises a source of compressed liquid oxygen coupled to a stream of water for irrigation of crops; a pressure sensor coupled to the stream of water for irrigation of crops, the pressure sensor measuring a pressure of the stream of water for irrigation of crops; and a control device coupled electronically to the pressure sensor such that the control device shuts off a flow of oxygen from the source of compressed liquid oxygen when the pressure sensor detects measures a pressure of the stream of water for irrigation crops that is less than a threshold, and wherein the system injects oxygen into the water without using any compressor, and the source of compressed liquid oxygen provides oxygen at a pressure greater than the pressure of the stream of water for irrigation of crops merely by the change in state from liquid oxygen to oxygen gas. The system includes no nozzle, for example. The control device may comprise a valve coupled electronically with the pressure sensor, and the valve may control the pressure and flow rate of the oxygen, for example, shutting off the flow of oxygen if the pressure sensor measures a pressure of the stream of water for irrigation crops less than a threshold pressure. The source of liquid oxygen may comprise an insulated tank, and the insulated tank may comprise an inner volume insulated by an outer shell. For example, the outer shell may contain vaporized oxygen gas such that the inner volume is chilled by phase transformation occurring within the outer shell, and the oxygen gas is held in the outer shell under pressure. An electrical power supply may supply power to the system, and the electrical power supply may comprise a solar panel, for example, for remote agricultural uses. The system may comprise an electrical switch, wherein the pressure sensor, the control device, and the electrical switch are electronically coupled and, when water pressure of the stream of water for irrigation of crops exceeds a first threshold pressure, as measured by the pressure sensor, the switch is capable of being switched on powering the system, and opening a valve of the control device permitting oxygen to flow through the valve and into the stream of water for irrigation of crops, and when the water pressure of the stream of water for irrigation of crops falls below the threshold pressure, as measured by the pressure sensor, then the switch switches off, closing the valve of the control device and stopping the flow of oxygen. For example, the valve of the control device may be a solenoid valve. The solenoid valve may be coupled to a pressure regulator coupled with the source of liquid oxygen on a first side of the solenoid valve. An opposite side of the solenoid valve may be coupled with a flow meter for measuring the flow rate of oxygen gas. In one example, the solenoid valve automatically shuts off the flow of gas when power to the solenoid valve is off, for any reason. The valve may comprise a manual control valve capable of controlling the flow rate of oxygen through the control valve by manually adjusting the control valve. The valve may comprise an adjustable control valve capable of controlling the flow rate of oxygen through the adjustable control valve manually by adjusting a potentiometer, remotely using a computer, automatically using feedback from a downstream dissolved oxygen sensor, or a combination thereof. In one example, the valve is adjustable automatically using feedback from a downstream dissolved oxygen sensor. The valve may be adjustable remotely using a computer, for example, which adjusts the setting of the valve to provide optimal oxygenation of the stream of irrigation water. For example, the system may comprise a flow meter coupled to the valve such that the flow rate of oxygen through the valve is measured by the flow meter. The flow meter may be an analog visual flow meter and may have a flow rate indicator that represents the flow rate, an upper range indicator and a lower range indicator, whereby a user manually adjusting the potentiometer for operation adjusts the flow rate indicator between the upper range indicator and the lower range indicator, manually. In one example, a signal light that indicates the state of the system may be provided. For example, the system may automatically determine the water pressure, using the pressure sensor, and automatically adjusts the flow rate, using an automatic, variable pressure regulator, to set the flow rate of oxygen to an optimal flow rate of oxygen based on pressure measured by the pressure sensor. The control device may use a signal from the pressure sensor and a signal from a dissolved oxygen sensor to control the concentration of dissolved oxygen in the stream of water for irrigation of crops, for example. A method for controlling the oxygenation of water using the system may comprise measuring pressure of the stream of water for irrigation of crops using the pressure sensor of the system; adjusting the control device such that the pounds of oxygen supplied by the system to the stream of water for irrigation of crops is within an optimal range for the number of acres being irrigated by the stream of water for irrigation of crops; and automatically shutting down the flow of oxygen through the control device if the pressure measured by the pressure sensor falls below a threshold pressure.

In one example, a control device comprises valving, pressure sensors and controls to manage the pressure of oxygen supplied by a supply of liquid oxygen, such as an insulated tank. The system comprises a tank of liquid oxygen. The tank is insulated inside an outer shell that holds oxygen as a gas and/or liquid. The liquid oxygen vaporizes, chilling the inner tank. The gas is held in the outer shell under compression for use. A safety vent bleeds oxygen from the outer shell to prevent the pressure from becoming excessive.

In one method, the pressure of the oxygen gas is matched to the pressure of the water by the system such that oxygen is injected into the stream of water, without a compressor and without a cavitation type of nozzle. By controlling the pressure of the oxygen and the water, the oxygen may be mixed with the water within the pressurized system. The system benefits from a higher dissolved concentration of oxygen in the water due to the pressure of the water in the system without creating an excessive number of large bubbles within the system.

In one example, by controlling the pressure, just the right amount of oxygen may be dissolved within the water to provide for enhanced crop yields and earlier crop maturation, providing the same economic benefits as a system with a cavitation type nozzle, but at a lower cost, less stress on the system and better uniformity. Off-the-shelf manifolds, nozzles and lines may be used to mix oxygen into the water and distribute it via drip irrigation, because both the pressure of the oxygen supply and water may be maintained at the correct pressure for mixing of oxygen with the water without producing excessive bubbles in the lines.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

FIG. 1 illustrates a known drip irrigation system as illustrated in U.S. Pat. No. 5,054,690. A portion of a known drip irrigation system 10 is shown with a pipe 16 a T-connection 14 extending to a manifold 12 distributing the fluid through lines 18. Some lines 18 may be staked using stakes 20 and outlets 22, while other lines 18 may be directed below the surface to plant roots. In this system, a housing 24 has a cover 30 and a cylindrical shell 26 with holes 28 for the pipe 18 and lines 18 to pass through the shell 26. Many other variations and combinations of piping, manifolds and lines may be used. To distribute fluids comprising water, and optionally nutrients, to plants in a field. Introducing excessive bubbles of air into the system can be problematic, causing damage to outlets, manifolds and lines. Alternatively, more expensive components must be used to prevent damage than would be necessary for distributing water without excessive air bubbles within the system.

Figure 2:
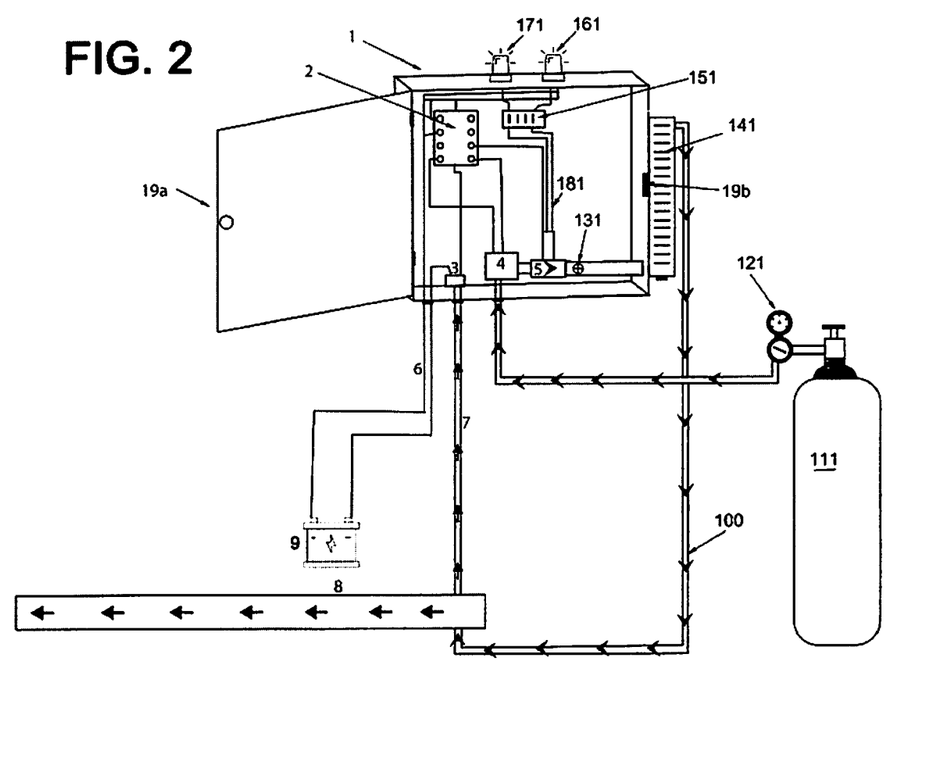
FIG. 2 illustrates an example of a liquid oxygen control box, which controls the mixing of oxygen from the source of liquid oxygen into a source of pressurized water.

In the example of FIG. 2, a liquid oxygen water enriching system 1 is enclosed in a lockable enclosure 19a, 19b. A fused or circuit breaker panel 2 distributes electrical power from a power source 9, which may be a battery, solar panel, generator, wind power, electrical outlet, other electrical power source or a combination of these to other devices within the system 1. A pressure sensor and switch 3 receives power from the power source 9 and provides it to the panel 2, When water pressure is present from the irrigation line. The pressure sensor and switch 3 measures the pressure of a pressurized water line 8 in real time. If the water pressure is lost, the power is cut off and the system 1 turns off, automatically, until the water pressure is detected again.

In the example of FIG. 2, the system 1 controls a solenoid valve 4 that couples a source of liquid oxygen 111, such as a LOX tank, via a gauged pressure regulator 121 and line connected to the solenoid valve 4. The solenoid valve 4 is controlled by the system 1 to automatically turn off the flow of oxygen if the power is shut off by the switch 3. The solenoid valve 4 turns on when water pressure is detected and opens the solenoid valve 4.

For example, a manual control valve 131 is provided for controlling the flow of the oxygen by manually adjusting the control valve 131. For example, an analog visual flow meter 141 is provided for quickly visualizing the flow rate of oxygen into the pressurized water line 8, allowing the user to quickly adjust the flow by adjusting the flow valve to the flow controller 5, for example. The flow switch detects the flow of oxygen gas and controls signal lights 161, 171 that may indicate the state of the system 1, such as by using green and red LEDs. For example, the green LED indicates there is a flow of oxygen through the system 1, while the red LED indicates there is no flow of oxygen through the system 1. No lights means the controller has no power detected. The lighting system allows the user to view from a significant distance whether or not the controller (LOX Box) is flowing Oxygen or not by observing the lights which save the user the inconvenience of having to stop and open the LOX box and check the flowmeter.

In the example illustrated in FIG. 2, there is no need for any compressor or any specialized nozzle for injecting oxygen into the pressurized water line, and the amount of oxygen may be controlled to add just the right amount of oxygen for dissolution into the water, according to calculations such as shown in Table A, for example, which prevents excessive bubbles in the water line, manifolds, and irrigation system, such as a drip irrigation system. Since the oxygen is added under pressure and remains under pressure while flowing to the crops, the oxygen dissolves in the water to provide the target concentration of oxygen in the water.

Figure 3:
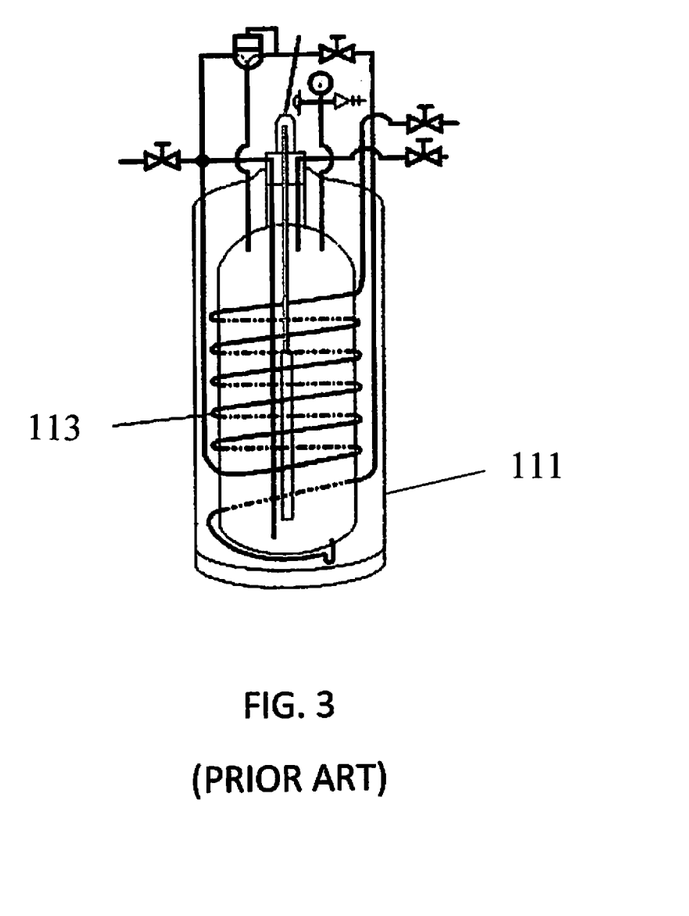
FIG. 3 shows an alternative control box arrangement.

In one example, the source of oxygen is a liquid oxygen container. The liquid oxygen is passed through and around the vessel to turn the liquid oxygen into gas and to keep the container cold. FIG. 3 illustrates an example of a prior art storage vessel 111 for liquid oxygen. The vessel 111 comprises a vaporizer 113 that vaporizes liquid oxygen providing oxygen gas fluidically available to valve 4 in FIG. 2, for example. The vessel 111 has valves, vents and the like to refill the storage volume and to fluidically couple the oxygen to the valve 4 in FIG. 2.

An example calculation for the system for an acre of crops to be irrigated is shown in Table A. The calculation uses 8.34 lbs/gal for water. Therefore, one million pounds equals about 120,000 gallons. The oxygen content (in parts per million or ppm) of the water prior to treatment is measured. A target concentration of water (in parts per million) is selected, based on target crop yields. Then, the deficit is calculated. An example of the amount of liquid oxygen is calculated based on this selection, which is added to the water over time. The flow rate of oxygen gas, under pressure, may be set by the system to provide the target oxygenation, based on a measured flow rate of the irrigation water supply through an irrigation pipe. The amount and cost of liquid oxygen used for this example application is surprisingly and unexpectedly affordable, especially when it is considered that no special nozzles or other mixing devices are required to oxygenate deep well water (example given) for agricultural use.

In one example, a water line is installed from the irrigation pipeline to the LOX Box. The water line is connected with a water pressure sensor 3, and the water pressure sensor 3 signals a controller when water is flowing through the irrigation pipeline (under pressure). The system prevents the flow of oxygen from the liquid oxygen tank when there is no water pressure in the irrigation pipeline (or the water pressure is below a threshold pressure). An oxygen delivery line 100 fluidically couples oxygen to the irrigation pipeline from a flow meter 141 of the system. The flow meter 141 is coupled to the liquid oxygen container via a regulator for regulating the flow of oxygen to the irrigation pipeline. The oxygen is provided as a compressed gas; therefore, no compressor is needed in the system. The controller is coupled to a source of electric power. In one method, a valve prevents flow through the system unless the controller detects the flow of water through the irrigation pipeline. For example, a shut-off valve is biased off unless power is provided to the controller and a pressure sensor connected to the irrigation system detects a threshold water pressure.

In one example, after pressurizing the system by opening one or more gas shutoff valves and regulators, the system is checked for leaks by applying water, which may comprise a surfactant, such as soap, at every connection. If leaks are detected, then the leaks are sealed prior to operation of the system.

In one example, a user manually adjusts the flow rate of oxygen through the system by adjusting a pressure regulator. For example, the flow meter 141 may have a target range indicated on the flow meter 141 by a pair of indicator lines. The pressure regulator is adjusted until the float in the flow meter is disposed between the pair of indicator lines, for example. Alternatively, a specific target flow rate may be set using a calibrated flow meter that displays a specific flow rate. Then, so long as water pressure is detected by the pressure sensor, and the water pressure remains constant, no further manual adjustment may be necessary. While water is flowing through the irrigation pipeline, the system will provide a set flow rate of oxygen into the water moving through the irrigation pipeline.

In one example, the system automatically determines the water pressure, using the pressure sensor, and adjusts the flow rate, using an automatic, variable pressure regulator, to match the flow rate of the oxygen to the flow rate of the irrigation water, as determined by the pressure sensor. As the pressure decreases, the regulator reduces the flow of oxygen, and as the pressure increases, the regulator increases the flow of oxygen. For example, an equation such as the example provide in Equation A may be used for correlating the pressure and the flow rate, as shown, based on characteristics of the irrigation pipeline, for example.

For example, the system may allow the user to set and target a specific oxygen level in ppm for a specific pressure of the irrigation water flow. Flow rate controls may allow users to set a specific target. For example, a mathematical model may be used to calculate a target oxygen flow rate needed for a particular irrigation flow rate. In one example, a target is set by determining a specific number of pounds of oxygen that is desired per acre irrigated. Table A provides one example. In the example of Table A, 0.23 pounds of water are added to every 4000 gallons of irrigation water per day, which raises the dissolved oxygen content from 2 parts per million to 9 parts per million of dissolved oxygen (based on a particular desire outcome for crop yields).

For example, Equation A shows an example of an equation for relating pressure and flow rate based on characteristics of an irrigation system. In one example, no equations are built into the controller of the system. In this example, the user manually sets the regulator to adjust the indicator on the flow meter to a target oxygen flow rate, based on calculations provided at the time that the system is integrated into an existing irrigation system. For example, a volume of water discharged from the irrigation system over time may be measured and may be correlated with pressure measured by the system's pressure sensor. Then, the target amount of oxygen may be determined based on the measured flow rate and the amount of oxygen measured in the source of water being used for irrigation water.

Surface water and well water start with different amounts of dissolved oxygen, for example. So, the amount of dissolved oxygen may be estimated or measured directly using a dissolved oxygen sensor. After this initial calibration of the system for the user, for example, the user may need only check the system periodically to make sure that the target oxygen flow rate is maintained and adjust the flow regulator as required to keep the target flow rate within a set range.

Alternatively, the controller 335 may use the sensors 3, 331 to automatically adjust the oxygen flow rate, using an automated flow regulator 337. For example, the controller and regulator 335, 337 may be integrated with a signal from the flow regulator 337 being internally routed within the controller 335 to maintain the correct flow rate based on measurements of the irrigation water pressure and oxygen pressure, which may be correlated to the flow rate of water through the irrigation system and flow rate of oxygen through the system. In one example, the pressure is adjusted from a low range to an upper range while the flow rate through the irrigation system is measured (e.g. by measuring volume of water passing through the system over time). Then, the flow of oxygen may be controlled by adjusting an automated flow regulator to meet the target amount of oxygen needed for a particular flow rate of irrigation water as determined by the pressure—flow rate correlation established during setup.

In another example, additional sensors may be added to the system, either by connecting the sensors directly to the system or by providing the information to the controller by way of a data communications system. A flow control device can be adjusted to meet the target oxygen level needed in the irrigation system if additional sensors are added, such as a sensor to measure the dissolved oxygen content in the source water. In one example, a digital, luminescent/optical dissolved oxygen (LDO) probe may be used to measure dissolved oxygen in the water source prior to injection of oxygen into the irrigation water. The amount of dissolved oxygen, such as in parts per million of dissolved oxygen, may be manually entered using a control panel of the system. For example, an LED display and a keypad may be included in the system to enter the dissolved oxygen. The controller may access the amount of dissolved oxygen and may determine the target oxygen flow rate. Alternatively, a sensor for measuring dissolved oxygen may be coupled to the controller electronically, allowing a signal from the sensor to provide the amount of dissolved oxygen in the irrigation source. In yet another embodiment, the system may comprise a communications system capable of communication with a remote or handheld communications device. In this example, the amount of dissolved oxygen detected by a sensor may be input into the remote or handheld communications device and may be transmitted to the controller of the system via the communication system of the system. The communication system may be a wireless or wired system capable of transmitting data to and/or from the system and a remote or handheld communications device.

In one example, a mobile cellular or landline is connected to the system, allowing the system to be inspected and adjusted remotely. In this case, a central base station may be used to control a plurality of irrigation systems without exposing the centralized base station to the elements. For example, sensor information may be logged and stored by the remote system for upload to the centralized base, periodically, or information may be streamed in real time from the remote system to the centralized base.

Figure 4:
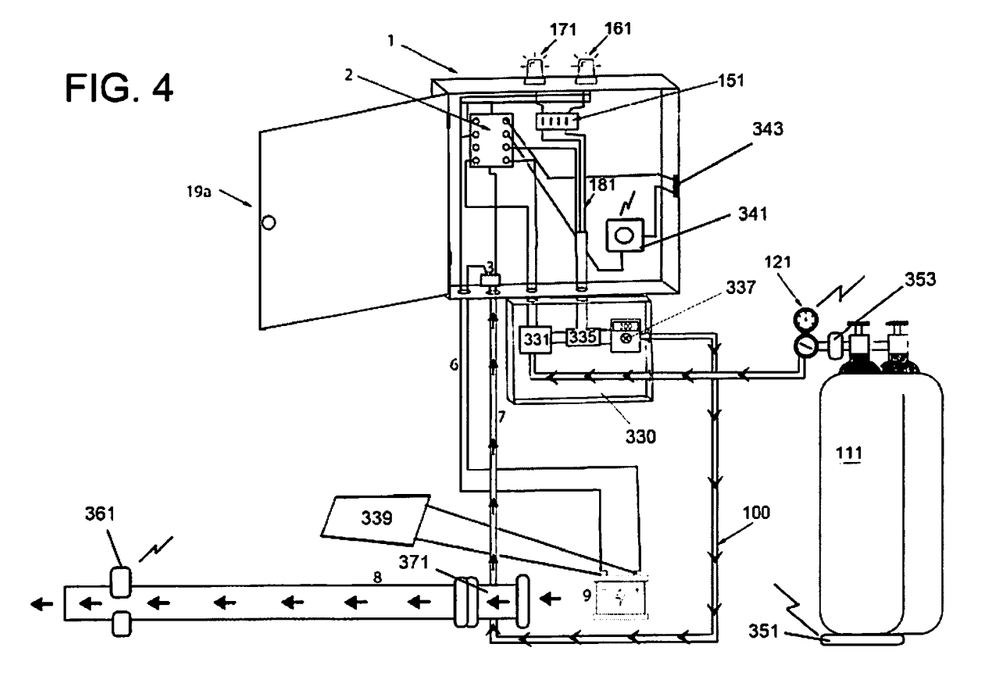
FIG. 4 illustrates another example of an oxygenation system utilizing liquid oxygen without any compressor or injector tip.

As shown in FIG. 4, one example uses two housings to encase the controls and adjustments for an oxygenation system. In this example, the second housing 330 may be adjacent to the housing previously described. For example, certain components of the system may be housed within the second housing. In one example, the second housing may be sealed shut to prevent undetected intrusion into the second housing. In this example, a cover may be welded or otherwise closed in a manner that discourages access to the components within the housing. A display 300 may be fixed on an outer surface of the second housing that shows a digital readout of the flow rate of oxygen through a flow controller 337, which may comprise a flow control valve and digital flow meter, for example. The controller 335 may be used to stop the flow of oxygen when the water pressure falls below a threshold, as detected by the water pressure indicator/sensor 331. As before, the various indicators may be coupled to the controller 335 for regulating the flow rate of oxygen using the flow controller 337 as a regulator.

In an alternative example, the second housing 330 may make the flow controller 337 accessible to the user for manually adjusting the flow controller 337, such as by inserting a screw driver into a manually adjustable mechanism to calibrate or set the flow controller 337 to a desired setting. In one example, the flow controller 337 comprises a potentiometer or POT to set a desired flow rate. In this example, the components that need to be accessed by the user for maintenance or control may be disposed in the second housing 330, while the first housing is sealed to prevent or deter access by a user other than an authorized technician. In FIG. 2, a digital readout 300 of the pressure is displayed to the user when the housing 330 is closed. For example, the display may be mounted on the exterior surface of the housing 330. Alternatively, the housing may provide a transparent window in the housing 330 to view the display 300.

In the example in FIG. 4, the system is powered by a solar energy using a solar system 339 connected to the battery 9 for field use. The solar system comprises the solar panel, shown, and any electronics required for charging the battery and/or delivering power at the correct current and voltage to the system. For example, the system may operate at 12 volts, as shown, and the solar system may manage the charging of the battery and delivery of power to the system during operation of the oxygenation system. For example, the status of the battery and the solar system may be detected by the system and may be logged to a remote server or queried by a remote user.

In the example in FIG. 4, a pressure sensor 121 and scale 351 are coupled wirelessly to the system in order to monitor the amount of liquid oxygen remaining in the tank 111, remotely. A technician may use the information provided to schedule delivery of a replacement tank. In one example, the tank 111 comprises a plurality of tanks monitored and controlled by a switch 353, remotely, allowing a technician to switch between an empty tank and a full tank. Alternatively, the system automatically switches between tanks when the pressure and/or mass of the first tank drops below a threshold pressure and/or mass. For example, controllers such as those provided by Sierra Instruments may be used to monitor mass flow and/or pressure.

In one example, such as illustrated in FIG. 4, schematically, a dissolved oxygen sensor monitors and reports, wirelessly, the level of dissolved oxygen in the water. For example, an optical electrode may use luminescence to detect dissolved oxygen, which measurement may be used by a technician or by the system, itself, to change the oxygen flow rate until the desired level of dissolved oxygen is detected in the water being used for irrigation.

In the example in FIG. 4, an antitampering device is shown. An antitampering device 341 is coupled to a sensor 343, which is capable of detecting when the cover of the first housing is opened without disabling the antitampering device 341, which comprises a camera that may take photos or video. In addition, the device may comprise a location tracking system, such as a system utilizing the global positioning system and software to determine the location of the device and to relay that information remotely, such as by a cellular or satellite network. Thus, a technician working remotely may determine the location of the system. In one example, when tampering is detected, video is commenced and is stored on a remote server for retrieval, the system is shut down to prevent tampering while the system is operational, and a notification is provided to a remote technician that access has been gained by an unauthorized person. For example, the remote technician may be able to determine if the access is authorized and may reset the system for operational use. For example, once the system is secure, the technician may remotely reset the antitampering device 341. In one example, the system includes local storage, such as storage on a solid state disk, which may be disposed in a controller or in an antitampering device, allowing local data to be retrieved by a technician on site or remotely, for example.

While the present system does not require any special injector or tip to produce microbubbles, the system may utilize such a tip and may benefit from the introduction of such an injector tip or system. Nothing in this application prevents the system from using such an injector if it benefits the oxygenation system; however, the system does not require any injector, merely connecting a input line with no injector to a section of irrigation line 371 and inserting the section between an upstream and downstream section of the irrigation line, as shown in FIG. 4, is sufficient to provide the benefits described herein, including the surprising and unexpected benefits, which achieves economical oxygenation of irrigation water that is far offset by increases in productivity as a result of controlling the dissolved oxygen in the water delivered by the irrigation system.

Any of the improvements disclosed in the examples in FIG. 4 may be incorporated in the example disclosed in FIG. 2 and vice versa.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A system for agricultural water oxygenation comprising:
    a source of compressed liquid oxygen coupled to a stream of water for irrigation of crops;
    a pressure sensor coupled to the stream of water for irrigation of crops, the pressure sensor measuring a pressure of the stream of water for irrigation of crops; and
    a control device coupled electronically to the pressure sensor such that the control device shuts off a flow of oxygen from the source of compressed liquid oxygen when the pressure sensor detects measures a pressure of the stream of water for irrigation crops that is less than a threshold, and wherein the system injects oxygen into the water without using any compressor, and the source of compressed liquid oxygen provides oxygen at a pressure greater than the pressure of the stream of water for irrigation of crops merely by the change in state from liquid oxygen to oxygen gas.

2. The system of claim 1, wherein no nozzle is used.

3. The system of claim 2, wherein the control device comprises a valve coupled electronically with the pressure sensor, and the valve controls the pressure and flow rate of the oxygen, shutting off the flow of oxygen if the pressure sensor measures a pressure of the stream of water for irrigation crops is less than a threshold pressure.

4. The system of claim 1, wherein the source of liquid oxygen comprises an insulated tank, and the insulated tank comprises an inner volume insulated by an outer shell, and the outer shell contains vaporized oxygen gas such that the inner volume is chilled by phase transformation occurring within the outer shell, and the oxygen gas is held in the outer shell under pressure.

5. The system of claim 1, further comprising an electrical power supply supplying power to the system.

6. The system of claim 5, wherein the electrical power supply comprises a solar panel.

7. The system of claim 1, further comprising an electrical switch, wherein the pressure sensor, the control device, and the electrical switch are electronically coupled and, when water pressure of the stream of water for irrigation of crops exceeds a threshold pressure as measured by the pressure sensor, the switch is capable of being switched on powering the system, and opening a valve of the control device permitting oxygen to flow through the valve and into the stream of water for irrigation of crops, and when the water pressure of the stream of water for irrigation of crops falls below the threshold pressure, as measured by the pressure sensor, then the switch switches off, closing the valve of the control device and stopping the flow of oxygen.

8. The system of claim 7, wherein the valve of the control device is a solenoid valve.

9. The system of claim 8, wherein the solenoid valve is coupled to a pressure regulator coupled with the source of liquid oxygen on a first side of the solenoid valve.

10. The system of claim 9, wherein an opposite side of the solenoid valve is coupled with a flow meter for measuring the flow rate of oxygen gas.

11. The system of claim 10, wherein the solenoid valve automatically shuts off the flow of gas when power to the solenoid valve is off, for any reason.

12. The system of claim 7, wherein the valve comprises a manual control valve capable of controlling the flow rate of oxygen through the control valve by manually adjusting the control valve.

13. The system of claim 7, wherein the valve comprises an adjustable control valve capable of controlling the flow rate of oxygen through the adjustable control valve manually by adjusting a potentiometer, remotely using a computer, automatically using feedback from a downstream dissolved oxygen sensor, or a combination thereof.

14. The system of claim 13, wherein the valve is adjustable automatically using feedback from a downstream dissolved oxygen sensor.

15. The system of claim 13, wherein the valve is adjustable remotely using a computer.

16. The system of claim 13, further comprising a flow meter coupled to the valve such that the flow rate of oxygen through the valve is measured by the flow meter.

17. The system of claim 16, wherein the flow meter is an analog visual flow meter and has a flow rate indicator that represents the flow rate, an upper range indicator and a lower range indicator, whereby a user manually adjusting the potentiometer for operation adjusts the flow rate indicator between the upper range indicator and the lower range indicator, manually.

18. The system of claim 13, further comprising a signal light that indicates the state of the system.

19. The system of claim 1, wherein the system automatically determines the water pressure, using the pressure sensor, and automatically adjusts the flow rate, using an automatic, variable pressure regulator, to set the flow rate of oxygen to an optimal flow rate of oxygen based on pressure measured by the pressure sensor.

20. The system of claim 1, wherein the control device uses a signal from the pressure sensor and a signal from a dissolved oxygen sensor to control the concentration of dissolved oxygen in the stream of water for irrigation of crops.

21. A method for controlling the oxygenation of water using the system of claim 1, the method comprising:
 measuring pressure of the stream of water for irrigation of crops using the pressure sensor of the system;
 adjusting the control device such that the pounds of oxygen supplied by the system to the stream of water for irrigation of crops is within an optimal range for the number of acres being irrigated by the stream of water for irrigation of crops; and
 automatically shutting down the flow of oxygen through the control device if the pressure measured by the pressure sensor falls below a threshold pressure.

* * * * *